United States Patent
Kwon et al.

(10) Patent No.: US 8,993,174 B2
(45) Date of Patent: *Mar. 31, 2015

(54) ELECTRODE ASSEMBLY HAVING NOVEL STRUCTURE AND SECONDARY BATTERY USING THE SAME

(71) Applicant: LG Chem, Ltd., Seoul (KR)

(72) Inventors: YoHan Kwon, Daejeon (KR); Sung-Kyun Chang, Daejeon (KR); Seung-tae Hong, Daejeon (KR); Je Young Kim, Daejeon (KR); SungJin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,528

(22) Filed: Dec. 5, 2013

(65) Prior Publication Data

US 2014/0093784 A1 Apr. 3, 2014

Related U.S. Application Data

(63) Continuation of application No. PCT/KR2012/004701, filed on Jun. 14, 2012.

(30) Foreign Application Priority Data

Jun. 23, 2011 (KR) .................. 10-2011-0061148
Jun. 30, 2011 (KR) .................. 10-2011-0064273

(51) Int. Cl.
*H01M 10/056* (2010.01)
*H01M 10/0565* (2010.01)
(Continued)

(52) U.S. Cl.
CPC ........ *H01M 10/0565* (2013.01); *H01M 10/052* (2013.01); *Y02T 10/7011* (2013.01);
(Continued)

(58) Field of Classification Search
None
See application file for complete search history.

(56) References Cited

U.S. PATENT DOCUMENTS 6,632,256 B1 10/2003 Ishizaki et al.
2004/0029010 A1 2/2004 Sada et al.
(Continued)

FOREIGN PATENT DOCUMENTS

JP 2001-351682 12/2001
JP 2005-285377 10/2005
(Continued)

OTHER PUBLICATIONS

PCT/ISA/210—International Search Report mailed on Jan. 3, 2013, issued in PCT/KR2012/004701.
(Continued)

*Primary Examiner* — Jonathan Crepeau
(74) *Attorney, Agent, or Firm* — Birch, Stewart, Kolasch & Birch, LLP

(57) ABSTRACT

Disclosed is an integrated electrode assembly having a structure in which a cathode, an anode, and a separation layer disposed between the cathode and the anode are integrated with one another, wherein the separation layer has a multi-layer structure including at least one two-phase electrolyte including a liquid phase component and a polymer matrix and at least one three-phase electrolyte including a liquid phase component, a solid component, and a polymer matrix, wherein the polymer matrices of the separation layer are coupled to the cathode or the anode and the liquid phase components of the separation layer are partially introduced into an electrode in a process of manufacturing the electrode assembly.

32 Claims, 3 Drawing Sheets

(51) Int. Cl.
*H01M 2/16* (2006.01)
*H01M 10/052* (2010.01)
*H01M 10/04* (2006.01)
*H01M 10/0525* (2010.01)
*H01M 10/0566* (2010.01)

(52) U.S. Cl.
CPC .......... *H01M 2/1653* (2013.01); *H01M 2/1686* (2013.01); *H01M 10/04* (2013.01); *Y02E 60/122* (2013.01); *H01M 10/0525* (2013.01); *H01M 2/166* (2013.01); *H01M 10/0566* (2013.01); *H01M 2300/0094* (2013.01)
USPC .......................... 429/303; 429/144; 429/249

(56) References Cited

U.S. PATENT DOCUMENTS

2004/0110068 A1* 6/2004 Seki et al. .................... 429/326
2005/0095504 A1* 5/2005 Kim et al. .................... 429/246
2005/0196677 A1 9/2005 Lee et al.

FOREIGN PATENT DOCUMENTS

| JP | 2005-310795 | 11/2005 |
| KR | 10-2002-0080797 A | 10/2002 |
| KR | 10-2005-0103068 A | 10/2005 |
| KR | 10-0731240 B1 | 6/2007 |
| KR | 10-0772565 B1 | 11/2007 |

OTHER PUBLICATIONS

Siekierski et al., "From Polymeric Systems, Through Composites to Hybrid Networks, Evolution of Electrolytes for Modern Electrochemical Power Sources", ECS Transactions, vol. 28, No. 8 (2010) pp. 53-63.

* cited by examiner

ELECTRODE ASSEMBLY HAVING NOVEL STRUCTURE AND SECONDARY BATTERY USING THE SAME

CROSS REFERENCE TO RELATED APPLICATIONS

This application is a Continuation Application of PCT/KR2012/004701 filed on Jun. 14, 2012, which claims priority under 35 U.S.C 119(a) to Patent Application Nos. 10-2011-0061148 and 10-2011-0064273 filed in the Republic of Korea on Jun. 23, 2011 and Jun. 30, 2011 respectively, all of which are hereby expressly incorporated by reference into the present application.

TECHNICAL FIELD

The present invention relates to an electrode assembly having a novel structure and a secondary battery using the same. More particularly, the present invention relates to an integrated electrode assembly having a structure in which a cathode, an anode, and a separation layer disposed between the cathode and the anode are integrated with one another, wherein the separation layer has a multilayer structure including at least one two-phase electrolyte including a liquid phase component and a polymer matrix and at least one three-phase electrolyte including a liquid phase component, a solid phase component, and a polymer matrix, wherein the polymer matrices of the separation layer are coupled to the cathode or the anode and the liquid phase components of the separation layer are partially introduced into an electrode in a process of manufacturing the electrode assembly.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, continues to be underway, and power storage devices for more efficient use of the generated energy are also drawing much attention. As these power storage devices, secondary batteries are mainly used. Among these, in particular, lithium secondary batteries are mainly used in portable devices, demand therefor increases due to lightweight, high voltage, and high capacity, and use of lithium secondary batteries continues to expand to applications such as electric vehicles, hybrid electric vehicles, and auxiliary power supplies through smart-grid technology.

However, to use lithium secondary batteries as high-capacity power sources, many challenges that need to be addressed remain, and the most important challenge is improvement in energy density and safety. In addition, uniformity of wetting due to large-scale area and reduction in manufacturing time are also one of the most important challenges to be addressed. Therefore, many researchers have put spurs to research into materials that have enhanced energy density and are manufactured at low cost and also put much effort into research on materials for enhancing safety.

As materials for enhancing energy density, Ni-based materials, Mn-based materials, and the like having higher capacity than that of conventionally used $LiCoO_2$ have been studied, and research into materials for forming an anode through Li alloy reaction instead of conventional intercalation reaction using Si, Sn, or the like, not using existing graphite-based materials is underway.

To enhance safety, research into a stable olivine-based cathode active material such as $LiFePO_4$, an anode active material such as $Li_4Ti_5O_{12}$, or the like is underway. However, such materials for enhancing safety fundamentally have low energy density and do not fundamentally address problems in terms of safety, caused due to structures of lithium secondary batteries.

Safety of secondary batteries may largely be classified into internal safety and external safety and further classified into electrical safety, impact safety, thermal safety, and the like. In these various safety problems, temperature increases when problems occur and, in this case, contraction of generally used stretching separators inevitably occurs.

Therefore, many researchers have proposed all solid type batteries to address safety problems, but such batteries cannot replace commercially available batteries due to several problems thereof.

First, currently used electrode active materials are in a solid state and, when a solid electrolyte or a polymer electrolyte is used, a contact surface between the solid electrolyte or the polymer electrolyte and the electrode active material for migration of lithium is very small. As a result, although a solid electrolyte or a polymer electrolyte itself has a conductivity of $10^{-5}$ s/cm, which corresponds to conductivity of a liquid electrolyte, ionic conductivity thereof is very low. Second, for such reason, ionic conductivity occurring at an interface between solids or an interface between a solid and a polymer is inevitably further reduced. Third, adhesive strength is important in manufacture of a battery and, even if a solid electrolyte with high conductivity is used, it is necessary to use a polymer binder, which causes further reduction in ionic conductivity. Fourth, to manufacture a battery, only a separation layer does not require ionic conductivity. To enhance ionic conductivity of an electrode, cathode and anode active materials also require materials for enhancing ionic conductivity and, when a solid electrolyte or a polymer electrolyte is used as an electrode component, capacity is reduced.

Therefore, there is a high need to develop a battery that prevents short circuit due to contraction of a separator and excellent electrical performance.

DISCLOSURE

Technical Problem

The present invention aims to address the aforementioned problems of the related art and to achieve technical goals that have long been sought.

Thus, inventors of the present application have intensively studied and implemented various experiments and, consequently, developed an integrated electrode assembly using a separation layer having a multilayer structure including a two-phase electrolyte and a three-phase electrolyte and confirmed that the integrated electrode assembly may prevent short circuit due to contraction of a separator and liquid phase components of the separation layer are introduced into an electrode in a process of manufacturing the electrode assembly, whereby wetting properties of the electrode are significantly enhanced, which results in enhanced ionic conductivity, thus completing the present invention.

Technical Solution

In accordance with one aspect of the present invention, provided is an integrated electrolyte assembly having a structure in which a cathode, an anode, and a separation layer disposed between the cathode and the anode are integrated with one another, wherein the separation layer has a multilayer structure including at least one two-phase electrolyte including a liquid phase component and a polymer matrix and at least one three-phase electrolyte including a liquid phase component, a solid phase component, and a polymer matrix, wherein the polymer matrices of the separation layer are coupled to the cathode or the anode, and the liquid phase components of the separation layer are partially introduced into an electrode in a process of manufacturing the electrode assembly.

According to experimental results obtained by the inventors of the present invention, a secondary battery undergoes highest risks in a charged state with high energy, and short circuit, which may occur due to contraction of a separator, or the like in a charged state, occurs in four cases: contact between a charged cathode and a charged anode; contact between a charged cathode and an anode current collector; contact between an anode current collector and a cathode current collector; and contact between a cathode current collector and a charged anode.

From the experimental results obtained by implementing an experiment using a charged electrode in a dry room under the above-described conditions, it can be confirmed that the severest thermal runaway occurred at the contact between a charged anode and a cathode current collector, contrary to what one would expect. The intensive studies found that such occurrence is caused by rapid exothermic reaction represented by $4Al+3O_2 \rightarrow 2Al_2O_3$ at, for example, an Al-foil as a cathode current collector. In most cases in which batteries exploded, the Al-foil cannot be found.

From the experiment, occurrence of thermal runaway only at the contact between a charged anode and a cathode current collector was confirmed, but it cannot be concluded that the other three cases are safe. In batteries, any contact between a cathode and an anode is dangerous.

By contrast, in the integrated electrode assembly according to the present invention, the polymer matrices and the solid phase component do not contract at high temperatures and thus occurrence of events, such as explosion, as in the experiment, and the like may be prevented, which results in excellent high-temperature stability.

In addition, the liquid phase components are introduced into an electrode in a process of manufacturing the electrode assembly, e.g., a lamination process and thus impregnate the electrode, whereby ionic conductivity of the electrode is enhanced, which results in enhanced performance of a battery including the electrode assembly. In addition, the electrolytes are uniformly wetted in the electrode and thus may minimize electrode degradation according to non-uniform permeation of the electrolytes, which is the biggest problem in large area fabrication. Thus, in the electrode assembly according to the present invention, the liquid phase components derived from the separation layer may be included or embedded in the electrode, related to states of the electrolytes. In this regard, the amount of the liquid phase components derived from the separation layer, included or embedded in the electrode, is not particularly limited and may for example be 10 to 90% based on a total amount of the liquid phase components included in the electrode assembly.

The two-phase electrolyte may include two phases including: a liquid phase component including an ionic salt and partially introduced into the electrode from the separation layer in a process of manufacturing the electrode assembly to enhance ionic conductivity of the electrode; and a polymer matrix having affinity with the liquid phase component and imparting adhesive strength for the cathode and the anode.

In addition, the three-phase electrolyte may include three phases including: a liquid phase component including an ionic salt and partially introduced into the electrode from the separation layer in a process for manufacturing the electrode assembly to enhance ionic conductivity of the electrode; a solid phase component supporting the three-phase electrolyte of the separation layer between the cathode and the anode; and a polymer matrix having affinity with the liquid phase component and imparting adhesive strength for the cathode and the anode.

In addition, when the separation layer having a multilayer structure is used, its advantages may be kept and, in terms of performance, problems due to polymer degradation may be minimized and safety, which is a characteristic required of a battery, may be maximized, when compared to use of the three-phase electrolyte alone.

In one embodiment, the electrode assembly according to the present invention has a structure in which a cathode, an anode, and a separation layer disposed between the cathode and the anode are integrated with one another, wherein the separation layer has a multilayer structure including:

at least one two-phase electrolyte including a liquid phase component including an ionic salt and a polymer matrix in which a linear polymer and a crosslinked polymer form a viscoelastic structure in a state of the liquid phase component being embedded; and at least one three-phase electrolyte including a liquid phase component including an ionic salt, a solid phase component supporting the separation layer between the cathode and the anode, and a polymer matrix in which a linear polymer and a crosslinked polymer form a viscoelastic structure in a state of the liquid and solid phase components being embedded.

Since the separation layer includes the polymer matrix in which a linear polymer and a crosslinked polymer form a viscoelastic structure in a state in which the liquid component and, optionally, the solid phase component are embedded, although volumetric expansion and contraction of the electrode are continuously repeated during charge and discharge of a battery, changes in volume may be reduced due to the viscoelastic structure and thus the battery may have high durability and, accordingly, may have enhanced cycle characteristics.

In general, when a membrane consisting of a single crosslinked structure and having a high degree of cross-linking is used, mobility of polymer chains, which affect movement of ions, is suppressed and thus ionic conductivity tends to decrease and the membrane exhibits brittleness in terms of mechanical/physical properties.

By contrast, when the above-described viscoelastic structure is used, polymer chains have appropriate mobility due to the linear polymer and thus may impart high ionic conductivity, and the crosslinked polymer forms cross-linking points in the polymer matrix and the linear polymer interconnects the cross-linking points and thus the separation layer may have elasticity and, accordingly, may have excellent mechanical/physical properties.

In one exemplary embodiment, the viscoelastic structure has a structure in which independent gels consisting of the crosslinked polymer are physically interconnected by the linear polymers in a state in which the liquid phase component is impregnated. In this regard, each of the independent gels consisting of the crosslinked polymer forms a cross-linking point and the cross-linking points are physically interconnected by the linear polymers, whereby a network may be formed and, accordingly, the liquid phase component may be impregnated in a large amount.

The linear polymers may have, for example, a physical connection structure such that a portion of the linear polymers permeates the gels formed of the crosslinked polymers. In this regard, such structure is preferably used for formation of the above-described network, and the size of the portion of the linear polymers, permeating the gels formed of the crosslinked polymers, may be less than 50%, for example, between 5 and 45%, based on a total size of the linear polymers.

Partial introduction of the liquid phase components of the separation layer into the electrode may be performed by pressurization. When an integrated battery with the above-described structure is manufactured, the liquid phase components of the separation layer may be introduced into the electrode using a separate pressurizing process since the separation layer contains the liquid phase components. In this case, wettability of the electrode may be enhanced and thus ionic conductivity problems, which are pointed out as a weak point of an existing polymer battery, may be addressed.

In a total composition of the separation layer, a weight ratio of liquid phase components to polymer matrices may be between 3:7 and 9:1. When the amount of the liquid phase components is too small, the wetting performance may be reduced and thus may adversely affect performance of a battery. On the other hand, when the amount thereof is too great, mobility of substances increases and thus there are difficulties in manufacturing processes.

In the total composition of the separation layer, a weight ratio of linear polymer to crosslinked polymer may be between 1:9 and 8:2.

In one exemplary embodiment, the liquid phase components may be an electrolyte solution including an ionic salt, and the ionic salt may be a lithium salt.

For example, the lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, and lithium tetraphenyl borate, without being limited thereto.

For example, the electrolyte solution may be at least one selected from the group consisting of ethylene carbonate, propylene carbonate, butylene carbonate, vinylene carbonate, diethyl carbonate, dimethyl carbonate, ethyl methyl carbonate, gamma butyrolactone, sulfolane, methyl acetate, and methyl propionate, without being limited thereto.

The solid phase component may be solid phase particles having an average particle diameter of 10 nm to 5 μm.

In particular, the solid phase component may be at least one material selected from the group consisting of an ion-conductive ceramic and oxide, nitride and carbide having no reactivity with lithium ions, and the oxide having no reactivity with lithium ions may be at least one material selected from the group consisting of MgO, TiO$_2$(Rutile), and Al$_2$O$_3$.

In the present invention, the linear polymer may be at least one selected from the group consisting of a polyoxide-based non-crosslinked polymer and a polar non-crosslinked polymer.

The polyoxide-based non-crosslinked polymer may for example be at least one selected from the group consisting of poly(ethylene oxide), poly(propylene oxide), poly(oxymethylene), and poly(dimethylsiloxane) and the polar non-crosslinked polymer may for example be at least one selected from the group consisting of polyacrylonitrile, poly(methyl methacrylate), poly(vinyl chloride), poly(vinylidene fluoride), poly(vinylidenefluoride-co-hexafluoropropylene), poly(ethylene imine), and poly(p-phenylene terephthalamide), without being limited thereto.

In one exemplary embodiment, the cross-linked polymer may be a polymer of monomers having at least two functional groups, or a copolymer of monomers having at least two functional groups and polar monomers having a single functional group.

The monomers having at least two functional groups may for example be at least one selected from the group consisting of trimethylolpropane ethoxylate triacrylate, polyethylene glycol dimethacrylate, polyethylene glycol diacrylate, divinylbenzene, polyester dimethacrylate, divinylether, trimethylolpropane, trimethylolpropane trimethacrylate, and ethoxylated bis phenol A dimethacrylate.

The polar monomers having a single functional group may for example be at least one selected from the group consisting of methyl methacylate, ethyl methacylate, butyl methacylate, methyl acrylate, butyl acrylate, ethylene glycol methyl ether acrylate, ethylene glycol methyl ether methacrylate, acrylonitrile, vinyl acetate, vinyl chloride, and vinyl fluoride.

In the present invention, the amount of the solid phase component may be between 20 and 90 wt % based on a weight of the polymer matrix of the three-phase electrolyte. When the amount of the solid phase component is less than 20 wt %, supporting force of the separation layer is weak and thus short circuit may occur. On the other hand, when the amount of the solid phase component exceeds 90 wt %, the amount of the liquid phase components relatively decreases and thus wetting performance may be deteriorated.

The separation layer may have various structures such as a structure including two layers formed of the two-phase electrolyte and the three-phase electrolyte, a structure including three layers formed of two-phase electrolyte/three-phase electrolyte/two-phase electrolyte, a structure including three layers formed of three-phase electrolyte/two-phase electrolyte/three-phase electrolyte, or the like.

In the electrode assembly according to the present invention, the cathode may be manufactured by, for example, coating, on a cathode current collector, a slurry prepared by adding a cathode mixture including a cathode active material to a solvent such as NMP or the like and drying the coated cathode current collector. The cathode mixture may optionally further include a binder, a conductive agent, filler, a viscosity controlling agent, and an adhesion promoter.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, aluminum or stainless steel surface-treated with carbon, nickel, titanium, or silver, or the like. In addition, as in an anode current collector, the cathode current collector may have fine irregularities at a surface thereof to increase adhesion between a cathode active material and the cathode current collector. In addition, the cathode current collector may be used in any of various forms including films, sheets, foils, nets, porous structures, foams, and non-woven fabrics.

The cathode active material is a material causing electrochemical reaction and may be a lithium transition metal oxide including at least two transition metals. Examples of the lithium transition metal oxide include, without being limited to, layered compounds such as lithium cobalt oxide (LiCoO$_2$) and lithium nickel oxide (LiNiO$_2$) substituted with one or more transition metals; lithium manganese oxides substituted with at least one transition metal; lithium nickel-based oxides having the formula LiNi$_{1-y}$M$_y$O$_2$, where M is at least one element selected from among Co, Mn, Al, Cu, Fe, Mg, B, Cr, Zn, and Ga and $0.01 \leq y \leq 0.7$; lithium nickel cobalt manganese composite oxides represented by $Li_{1+z}Ni_bMn_cCo_{1-(b+c+d)}M_dO_{(2-e)}A_e$, where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M is Al, Mg, Cr, Ti, Si, or Y, and A=F, P, or Cl, such as $Li_{1+z}Ni_{1/3}CO_{1/3}Mn_{1/3}O_2$, $Li_{1+z}Ni_{0.4}Mn_{0.4}Co_{0.2}O_2$, and the like; and olivine-based lithium metal phosphate represented by $Li_{1+x}M_{1-y}M'_yPO_{4-z}X_z$ where M=transition metal, preferably, Fe, Mn, Co, or Ni, M'=Al, Mg, or Ti, X=F, S, or N, $-0.5 \leq x \leq +0.5$, $0 \leq y \leq 0.5$, and $0 \leq z \leq 0.1$.

Examples of the binder include, without being limited to, polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, various copolymers, and polyvinyl alcohol with high degree of hydrolysis (polyvinyl alcohol of high saponification).

The conductive material is not particularly limited so long as it does not cause chemical changes in the fabricated battery and has conductivity. Examples of the conductive material include, without being limited to, graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. In particular, commercially available conductive materials include acetylene black series manufactured by Chevron Chemical, Denka black manufactured by Denka Singapore private limited, products manufactured by Gulf O10, Ketjen black, EC series manufactured by Armak, Vulcan XC-72 manufactured by Cabot, and Super P manufactured by Timcal.

The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The viscosity controlling agent is a component for controlling the viscosity of an electrode mixture so as to facilitate mixing of the electrode mixture and coating thereof on a current collector and may be added in an amount of 30 wt % based on a total weight of an anode mixture. Examples of the viscosity controlling agent include, without being limited to, carboxymethylcellulose and polyvinylidene fluoride. In some cases, the above-described solvent may serve as a viscosity controlling agent.

The adhesion promoter is an auxiliary component added to enhance adhesion between an electrode active material and an electrode current collector and may be added in an amount of 10 wt % or less based on the amount of the binder. Examples of the adhesion promoter include, without being limited to, oxalic acid, adipic acid, formic acid, acrylic acid derivatives, and itaconic acid derivatives.

The anode is manufactured by, for example, coating, on an anode current collector, a slurry prepared by adding an anode mixture including an anode active material to a solvent such as NMP or the like and drying the coated anode current collector. The anode mixture may optionally further include the components described above with regards to the configuration of the cathode, such as the binder, the conductive agent, the filler, the viscosity controlling agent, and the adhesion promoter.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. The anode current collector may also have fine irregularities at a surface thereof to enhance adhesion between the anode current collector and an anode active material and be used in various forms including films, sheets, foils, nets, porous structures, foams, and non-woven fabrics.

Examples of the anode active material include, without being limited to, carbon and graphite materials such as natural graphite, artificial graphite, expandable graphite, carbon fibers, hard carbon, carbon black, carbon nanotubes, fullerene, and activated carbon; metals alloyable with lithium such as Al, Si, Sn, Ag, Bi, Mg, Zn, In, Ge, Pb, Pt, and Ti and compounds containing these elements; complexes of metals and compounds thereof and complexes of carbon and graphite materials; and lithium-containing nitrides. Among these, a carbon-based active material, a tin-based active material, a silicon-based active material, or a silicon-carbon-based active material is more preferably used. These anode active materials may be used alone or in combination of two or more thereof.

The present invention also provides a method of manufacturing the integrated electrolyte assembly, the method including:

(1) preparing a mixture for a two-phase or three-phase electrolyte by uniformly mixing a linear polymer, monomers for a crosslinked polymer, a liquid phase component including an ionic salt, a polymerization initiator and, optionally, a solid phase component;

(2) coating the mixture for a two-phase or three-phase electrolyte on an electrode;

(3) forming a two-phase or three-phase electrolyte layer by performing polymerization through UV irradiation or application of heat;

(4) forming a separation layer including a plurality of electrolyte layers by repeatedly performing processes (2) and (3) on the two-phase or three-phase electrolyte layer; and (5) mounting a counter electrode on the separation layer and pressing the resulting structure.

In a conventional method, a mold for forming a space between a cathode and an anode is fabricated, a mixture of a polymer and a monomer is injected into the space, and the resulting structure is polymerized, thereby completing fabrication of an electrode assembly. However, there are many difficulties in manufacturing processes.

By contrast, as in the prevent invention, coating of a single electrode with a predetermined material and polymerization thereof may simplify manufacturing processes and the liquid phase components of the separation layer are partially introduced into the electrode in the pressing process (process (5)) and thus impregnated therein, whereby ionic conductivity of the electrode may be enhanced, which results in enhanced battery performance.

In addition, the linear polymer is mixed in the form of a polymer, not in the form of monomers, in process 1 of the manufacturing method and thus a physical connection structure may be formed such that a portion of the linear polymer permeates a gel formed of the cross-linked polymer during polymerization of the cross-linked polymer in process (3).

The present invention also provides a lithium secondary battery including the integrated electrode assembly and, optionally, a lithium salt-containing non-aqueous electrolyte. In one exemplary embodiment, the lithium secondary battery may not include a separate lithium salt-containing non-aqueous electrolyte or only a small amount thereof.

This configuration is possible since the liquid phase components of the separation layer are partially introduced into the electrode by pressing in process (5) of the manufacturing method and thus the electrode is impregnated therewith. Considering the fact that the electrode impregnation process is a bottleneck in battery fabrication, a secondary battery with excellent manufacturing efficiency may be provided.

The present invention also provides a medium to large-scale battery module including the lithium secondary battery as a unit battery and a battery pack including the battery module. The battery pack may be used, in particular, in medium to large-scale devices which require high rate characteristics and high-temperature safety. For example, the battery pack may be used as a power source of electric motor-driven power tools; electric vehicles (EVs), hybrid electric vehicles (HEVs), and plug-in hybrid electric vehicles (PHEVs); electric two-wheeled vehicles such as E-bikes and E-scooters; and electric golf carts and may be used in systems for storing power, but embodiments are not limited thereto.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings. These examples are provided only for illustrative purposes and should not be construed as limiting the scope and spirit of the present invention.

Figure 1:
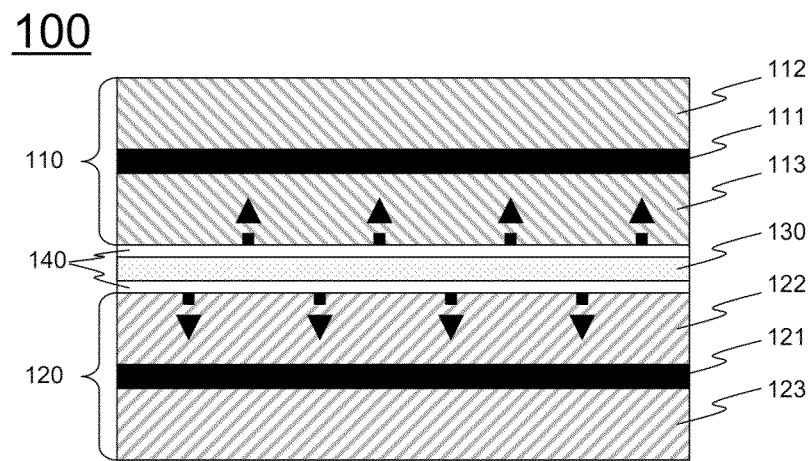
FIG. 1 is a sectional view of an integrated electrode assembly according to an embodiment of the present invention.
Figure 2:
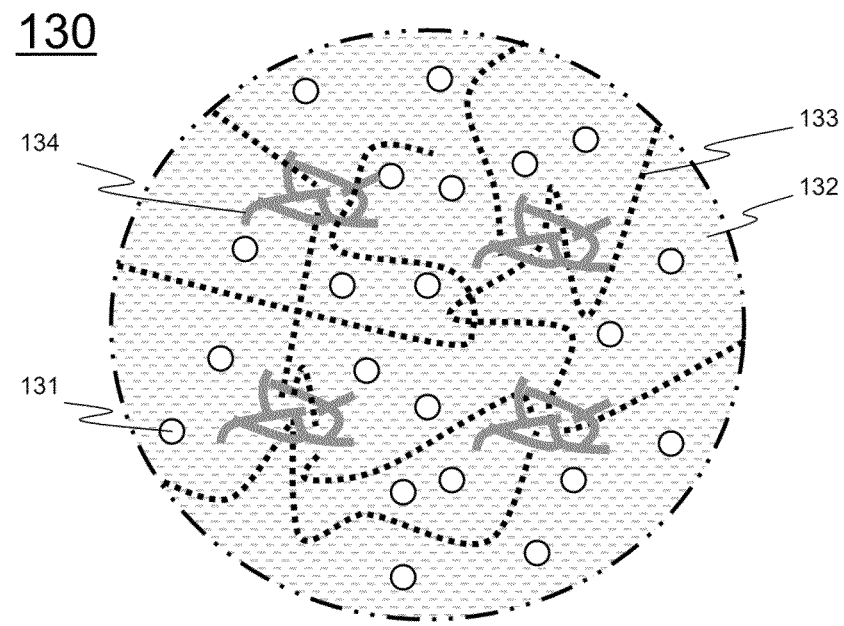
FIG. 2 is an enlarged view of a three-phase separation layer of FIG. 1.
Figure 3:
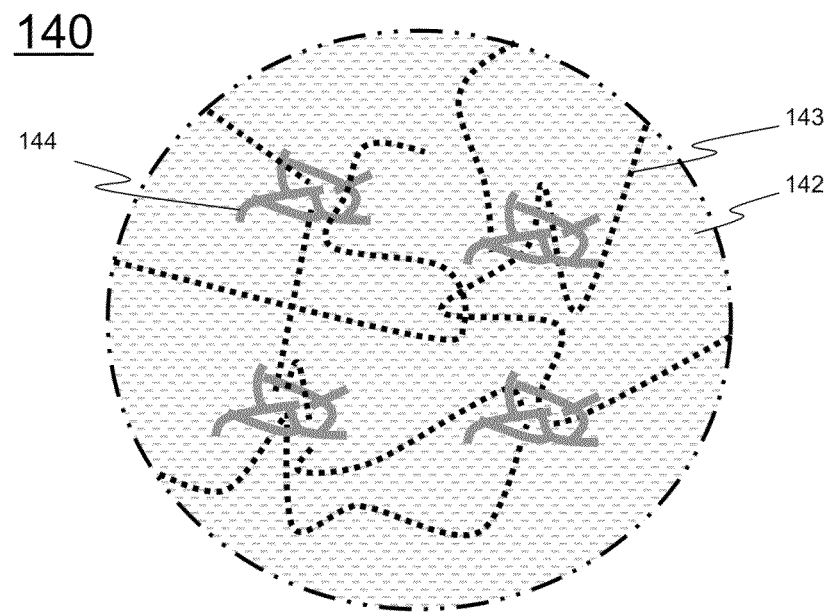
FIG. 3 is an enlarged view of a two-phase separation layer of FIG. 1.

FIG. 1 is a sectional view of an integrated electrode assembly 100 according to an embodiment of the present invention. FIGS. 2 and 3 are enlarged views of a three-phase separation layer 130 and a two-phase separation layer 140, respectively.

Referring to FIGS. 1 to 3, the electrode assembly 100 includes a cathode 110, an anode 120, and a separation layer having a multilayer structure including the three-phase separation layer 130 and the two-phase separation layer 140. The cathode 110 has a structure in which cathode mixtures 112 and 113 are respectively coated on opposite sides of a cathode current collector 111 and the separation layer having a multilayer structure is disposed between the cathode 110 and the anode 120.

The three-phase separation layer 130 includes: a solid phase component 131; a liquid phase component 132; and a polymer matrix in which a linear polymer 133 and a cross-linked polymer 134 form a viscoelastic structure in a state in which the solid phase component 131 and the liquid phase component 132 are embedded.

In addition, the two-phase separation layer 140 does not include a separate solid phase component and includes a liquid phase component 142 and a polymer matrix in which a linear polymer 143 and a crosslinked polymer 144 form a viscoelastic structure in a state in which the liquid phase component 142 is embedded.

In the integrated electrode assembly including the separation layer having a multilayer structure, the polymer matrices and the solid phase component do not contract at high temperatures and thus occurrence of events such as explosion and the like may be prevented, which results in enhanced high-temperature safety.

In addition, due to the two-phase separation layer 140 including a relatively large amount of the liquid phase component 142, the liquid phase components 132 and 142 are introduced into the cathode 110 and the anode 120 in a process of manufacturing the electrode assembly, e.g., a lamination process, in a direction indicated by arrows of FIG. 1 and thus the cathode 110 and the anode 120 are impregnated therewith, whereby ionic conductivity of the cathode 110 and the anode 120 is enhanced, which results in enhanced battery performance. In addition, electrolytes are uniformly wetted in the cathode 110 and the anode 120 and thus may minimize degradation of the cathode 110 and the anode 120 according to non-uniform permeation of the electrolytes, which is the biggest problem in large-scale area fabrication.

Now, the present invention will be described in more detail with reference to the following examples. These examples are provided only for illustrative purposes and should not be construed as limiting the scope and spirit of the present invention.

Example 1

An anode was fabricated by coating a Cu foil with a slurry prepared by adding graphite, PVdF, and carbon black to NMP and drying the coated Cu foil at about 130° C. for 2 hours. A cathode was fabricated by coating an Al foil with a slurry prepared by adding $LiNiMnCoO_2/LiMnO_2$, PVdF, and carbon black to NMP and drying the coated Al foil at about 130° C. for 2 hours.

A two-phase electrolyte layer and a three-phase electrolyte layer were prepared so as to have composition ratios shown in Table 1 below, and benzoin, which is a UV initiator, was added in an amount of 3 wt % based on the amount of PEGDMA.

TABLE 1

| | Organic electrolyte solution (1M $LiPF_6$, EC/DEC = 1/1) | PEO | PEGDMA | $SiO_2$ |
|---|---|---|---|---|
| Two-phase electrolyte layer | 50 | 25 | 25 | — |
| Three-phase electrolyte layer | 83.7 | 7.4 | 7.4 | 1.5 |

A two-phase electrolyte was coated on surfaces of the prepared cathode and anode, followed by polymer cross-linking through UV irradiation, to form a polymer electrolyte layer having a viscoelastic structure. Thereafter, a three-phase electrolyte was coated on the cathode with the two-phase electrolyte layer formed thereon, followed by polymer cross-linking through UV irradiation, to form a polymer electrolyte layer having a viscoelastic structure. The anode and cathode with the electrolyte layers formed thereon are assembled, followed by lamination, thereby completing fabrication of the electrode assembly. Afterwards, the electrode assembly was inserted into a pouch, thereby completing manufacture of a secondary battery.

Comparative Example 1

A secondary battery was manufactured by inserting an olefin-based porous separator between the cathode and the anode prepared according to Example 1 and further injecting a liquid electrolyte solution thereinto.

Experimental Example 1

Characteristics of the secondary battery manufactured according to Example 1 were evaluated without performing a separate impregnation process.

The secondary battery of Example 1 was charged at a current density of 0.1 C and a constant current (CC) until voltage reached 4.2 V and maintained at a constant voltage (CV) of 4.2 V and, when current density reached 0.05 C, the charging process was completed. In addition, the secondary battery of Example 1 was discharged at a current density of 0.1 C and a CC until voltage reached 2.5 V. Charging and discharging cycles were repeated by 50 times under the same conditions.

A discharge profile of the secondary battery of Example 1 exhibited excellent discharge characteristics and high capacity although a separate electrolyte solution was not added and a separate impregnation process was not implemented.

Figure 4:
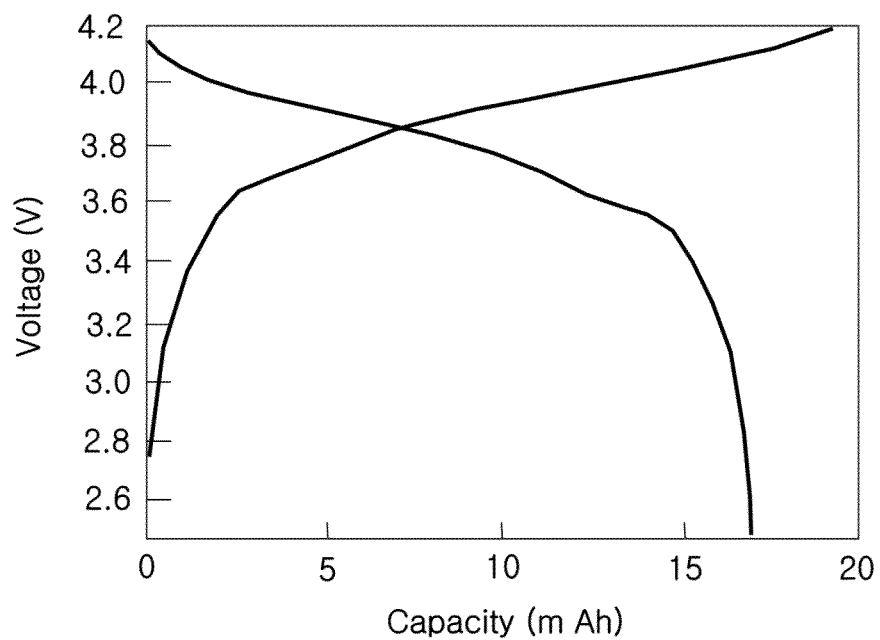
FIG. 4 is a graph showing a relationship between voltage and capacity of the integrated electrode assembly according to the present invention.
Figure 5:
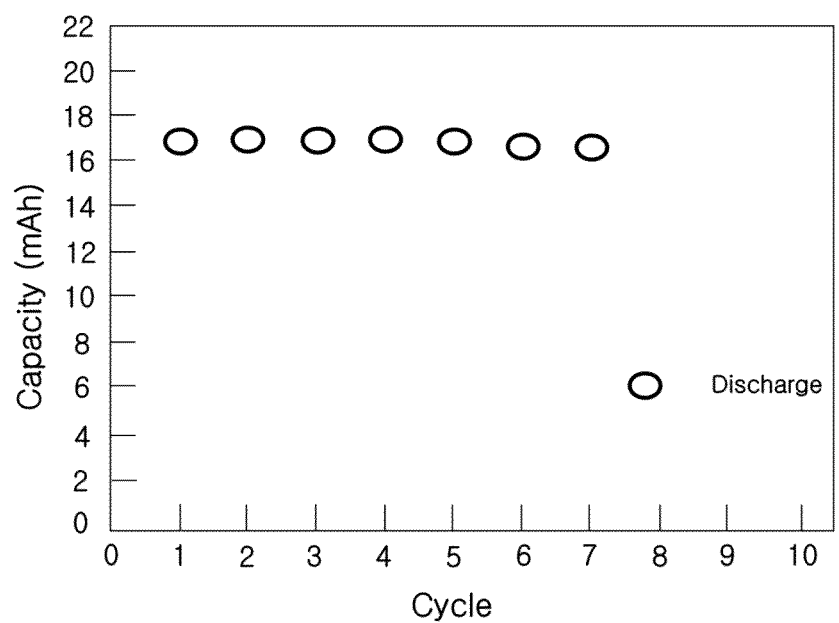
FIG. 5 is a graph showing cycle characteristics of a secondary battery according to an embodiment of the present invention.

A first charge-discharge profile and cycle lifespan characteristics of the secondary battery of Example 1 are shown in FIGS. 4 and 5, respectively. From the results, it can be confirmed that a battery including a polymer electrolyte having a multilayer structure exhibited excellent intrinsic battery material properties. In addition, it can be confirmed that the secondary battery of Example 1 exhibited stable cycle lifespan characteristics without fading. Thus, it can be confirmed that manufacturing efficiency is enhanced by reducing wetting time of an electrolyte solution by coating of an electrolyte layer.

Experimental Example 2

Characteristics of the secondary batteries of Example 1 and Comparative Example 1 were evaluated without separation impregnation. Discharge capacity in a first charge/discharge cycle of each secondary battery is shown in Table 2 below.

TABLE 2

|  | 1$^{st}$ discharge capacity | Capacity with respect to theoretical capacity (17 mAh) |
|---|---|---|
| Example 1 | 16.5 mAh | 97.0% |
| Comparative Example 1 | 15.5 mAh | 91.2% |

Table 2 shows evaluation results of charge/discharge characteristics of the secondary batteries of Example 1 and Comparative Example 1 without performing impregnation of the electrolyte solution. From the results shown in Table 2, it can be confirmed that the secondary battery of Example 1 exhibited higher 1$^{st}$ discharge capacity than that of the secondary battery of Comparative Example 1 and high capacity with respect to theoretical capacity (17 mAh).

INDUSTRIAL APPLICABILITY

As described above, according to an integrated electrode assembly in accordance with the present invention, short circuit due to contraction of a separator may be prevented, an electrode is impregnated with an electrolyte solution in manufacturing processes and thus problems such as electrode non-uniformity during wetting and an increase in milling time may be addressed. In addition, ionic conductivity of an electrode and safety may be enhanced, which results in enhanced long-term performance or storage characteristics of a battery including the integrated electrode assembly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An integrated electrode assembly having a structure in which a cathode, an anode, and a separation layer disposed between the cathode and the anode are integrated with one another,
    wherein the separation layer has a multilayer structure comprising: at least one two-phase electrolyte comprising a first liquid phase component and a first polymer matrix; and at least one three-phase electrolyte comprising a second liquid phase component, a solid phase component, and a second polymer matrix,
    wherein the first and second polymer matrices of the separation layer are coupled to the cathode or the anode, and the first and second liquid phase components of the separation layer are partially introduced into an electrode in a process of manufacturing the electrode assembly,
    wherein the separation layer has a multilayer structure comprising: at least one two-phase electrolyte comprising the first liquid phase component comprising a first ionic salt, and the first polymer matrix in which a first linear polymer and a first crosslinked polymer form a first viscoelastic structure in a state of the first liquid phase component is embedded, and
    at least one three-phase electrolyte comprising the second liquid phase component comprising a second ionic salt, a solid phase component supporting the separation layer between the cathode and the anode, and the second polymer matrix in which a second linear polymer and a second crosslinked polymer form a second viscoelastic structure in a state of the second liquid phase component and the solid phase component is embedded,
    wherein the first viscoelastic structure has a structure in which first independent gels comprising the first crosslinked polymer are physically interconnected by the first linear polymers in a state in which the first liquid phase component is impregnated, and
    wherein the second viscoelastic structure has a structure in which second independent gels comprising the second crosslinked polymer are physically interconnected by the second linear polymers in a state in which the second liquid phase component is impregnated.

2. The integrated electrode assembly according to claim 1, wherein the two-phase electrolyte comprises two phases comprising: a first liquid phase component comprising a first ionic salt and partially introduced into the electrode from the separation layer in a process of manufacturing the electrode assembly to enhance ionic conductivity of the electrode; and a first polymer matrix having affinity with the first liquid phase component and imparting adhesive strength for the cathode and the anode.

3. The integrated electrode assembly according to claim 1, wherein the three-phase electrolyte comprises three phases comprising: a second liquid phase component comprising a second ionic salt and partially introduced into the electrode from the separation layer in a process for manufacturing the electrode assembly to enhance ionic conductivity of the electrode; a solid phase component supporting the three-phase electrolyte of the separation layer between the cathode and the anode; and a second polymer matrix having affinity with the second liquid phase component and imparting adhesive strength for the cathode and the anode.

4. The integrated electrode assembly according to claim 1, wherein the first and second linear polymers, respectively, have a physical connection structure such that a portion of the first and second linear polymers permeate the first and second gels comprising the first and second crosslinked polymers.

5. The integrated electrode assembly according to claim 1, wherein partial introduction of the first and second liquid phase components of the separation layer is performed by pressurization.

6. The integrated electrode assembly according to claim 1, wherein a weight ratio of the first and second liquid phase components to the first and second polymer matrices in a total composition of the separation layer is between 3:7 and 9:1.

7. The integrated electrode assembly according to claim 1, wherein a weight ratio of the first and second linear polymer to the first and second crosslinked polymer in a total composition of the separation layer is between 1:9 and 8:2.

8. The integrated electrode assembly according to claim 1, wherein the first and second liquid phase components are electrolyte solutions comprising the first and second ionic salt, respectively.

9. The integrated electrode assembly according to claim 8, wherein the first and second ionic salt is a lithium salt.

10. The integrated electrode assembly according to claim 9, wherein the lithium salt is at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, and lithium tetraphenyl borate.

11. The integrated electrode assembly according to claim 8, wherein the electrolyte solution is at least one selected from the group consisting of ethylene carbonate, propylene carbonate, butylene carbonate, vinylene carbonate, diethyl carbonate, dimethyl carbonate, ethyl methyl carbonate, gamma butyrolactone, sulfolane, methyl acetate, and methyl propionate.

12. The integrated electrode assembly according to claim 1, wherein the solid phase component comprises solid phase particles having an average particle diameter of 10 nm to 5 µm.

13. The integrated electrode assembly according to claim 1, wherein the solid phase component is a solid compound having no reactivity with lithium ions, or ceramic and a solid compound having no reactivity with lithium ions.

14. The integrated electrode assembly according to claim 13, wherein the solid compound is at least one selected from the group consisting of an ion-conductive ceramic and oxide, nitride and carbide having no reactivity with lithium ions.

15. The integrated electrode assembly according to claim 14, wherein the oxide having no reactivity with lithium ions is at least one selected from the group consisting of MgO, TiOhd 2(Rutile), and $Al_2O_3$.

16. The integrated electrode assembly according to claim 1, wherein the first and second polymer matrices are at least one selected from the group consisting of a polyoxide-based non-crosslinked polymer and a polar non-crosslinked polymer.

17. The integrated electrode assembly according to claim 16, wherein the polyoxide-based non-crosslinked polymer is at least one selected from the group consisting of poly(ethylene oxide), poly(propylene oxide), poly(oxymethylene), and poly(dimethylsiloxane).

18. The integrated electrode assembly according to claim 16, wherein the polar non-crosslinked polymer is at least one selected from the group consisting of polyacrylonitrile, poly(methyl methacrylate), poly(vinyl chloride), poly(vinylidene fluoride), poly(vinylidenefluoride-co-hexafluoropropylene), poly(ethylene imine), and poly(p-phenylene terephthalamide).

19. The integrated electrode assembly according to claim 1, wherein the first and second crosslinked polymers are a polymer of monomers having at least two functional groups, or a copolymer of monomers having at least two functional groups and polar monomers having a single functional group.

20. The integrated electrode assembly according to claim 19, wherein the monomers having at least two functional groups comprise at least one selected from the group consisting of trimethylolpropane ethoxylate triacrylate, polyethylene glycol dimethacrylate, polyethylene glycol diacrylate, divinylbenzene, polyester dimethacrylate, divinylether, trimethylolpropane, trimethylolpropane trimethacrylate, and ethoxylated bis phenol A dimethacrylate.

21. The integrated electrode assembly according to claim 19, wherein the polar monomers having a single functional group comprise at least one selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

22. The integrated electrode assembly according to claim 1, wherein an amount of the solid phase component is between 20 and 90 wt % based on a weight of the second polymer matrix of the three-phase electrolyte.

23. The integrated electrode assembly according to claim 1, wherein the separation layer comprises two layers formed of the two-phase electrolyte and the three-phase electrolyte.

24. The integrated electrode assembly according to claim 1, wherein the separation layer comprises three layers formed of the two-phase electrolyte/the three-phase electrolyte/the two-phase electrolyte.

25. The integrated electrode assembly according to claim 1, wherein the separation layer comprises three layers formed of the three-phase electrolyte/the two-phase electrolyte/the three-phase electrolyte.

26. A method of manufacturing the integrated electrode assembly according to claim 1, the method comprising:
preparing a mixture for a two-phase or three-phase electrolyte by uniformly mixing a linear polymer, monomers for a crosslinked polymer, a liquid phase component comprising an ionic salt, a polymerization initiator and, optionally, a solid phase component;
coating the mixture for a two-phase or three-phase electrolyte on an electrode;

forming a two-phase or three-phase electrolyte layer by performing polymerization through UV irradiation or application of heat;

forming a separation layer including a plurality of electrolyte layers by repeatedly performing the coating and the forming on the two-phase or three-phase electrolyte layer; and mounting a counter electrode on the separation layer and pressurizing the resulting structure.

27. A lithium secondary battery comprising the integrated electrode assembly according to claim 1.

28. A battery module comprising the lithium secondary battery according to claim 27 as a unit battery.

29. A battery pack comprising the battery module according to claim 28.

30. The battery pack according to claim 29, wherein the battery pack is included as a power source of a medium to large-scale device.

31. The battery pack according to claim 30, wherein the medium to large-scale device is an electric vehicle, a hybrid electric vehicle, a plug-in hybrid electric vehicle, or a system for storing power.

32. The integrated electrode assembly according to claim 1, wherein the two-phase electrolyte is coated on a surface of the cathode, followed by polymer cross-linking to form a polymer electrolyte layer having the first viscoelastic structure, and wherein the three-phase electrolyte is coated on the cathode with the two-phase electrolyte layer formed thereon, followed by polymer cross-linking to form a polymer electrolyte layer having the second viscoelastic structure.

* * * * *